No. 617,843. Patented Jan. 17, 1899.
W. L. WHITLEY.
STALK RAKE.
(Application filed Apr. 30, 1898.)
(No Model.) 2 Sheets—Sheet 2.
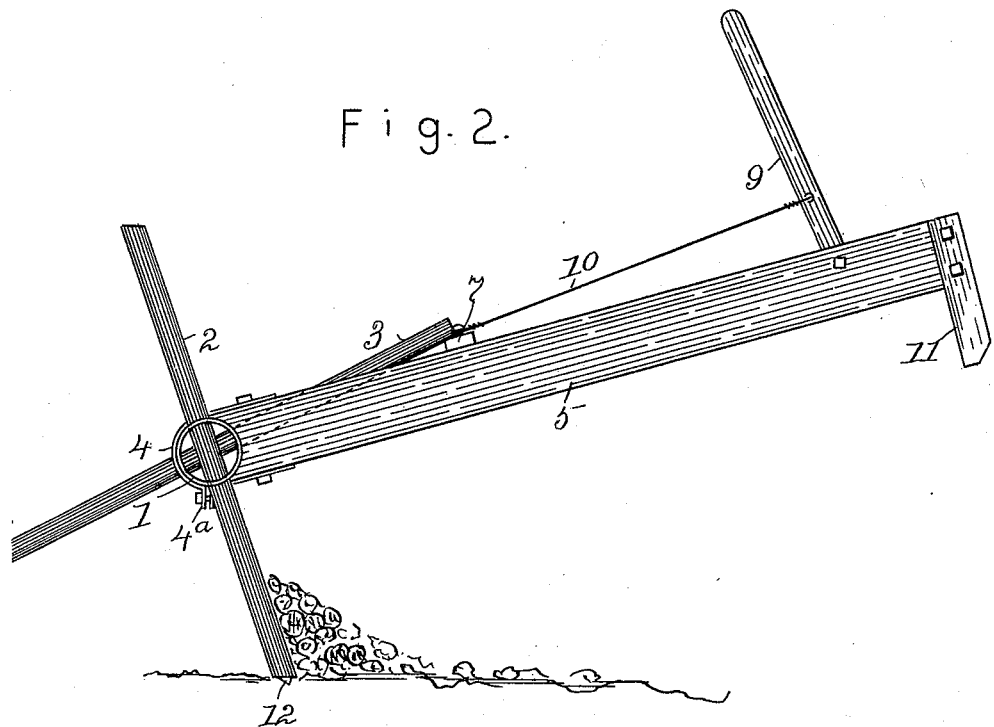
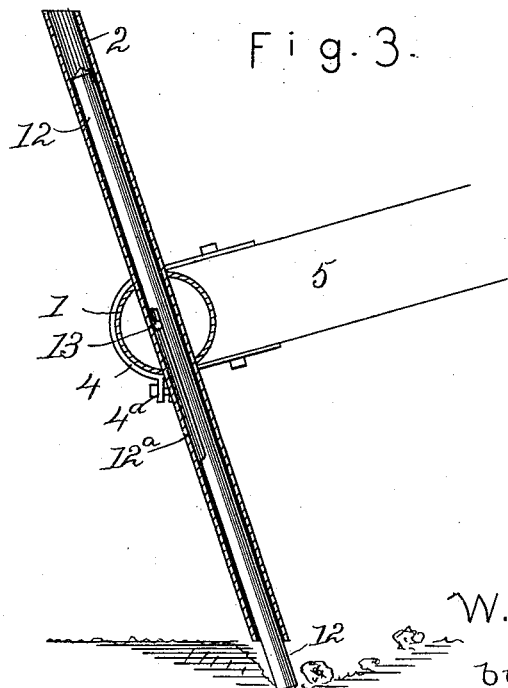
Attest.
Nora Graham
Ina Graham
INVENTOR
W. L. WHITLEY
by L. P. Graham
his attorney

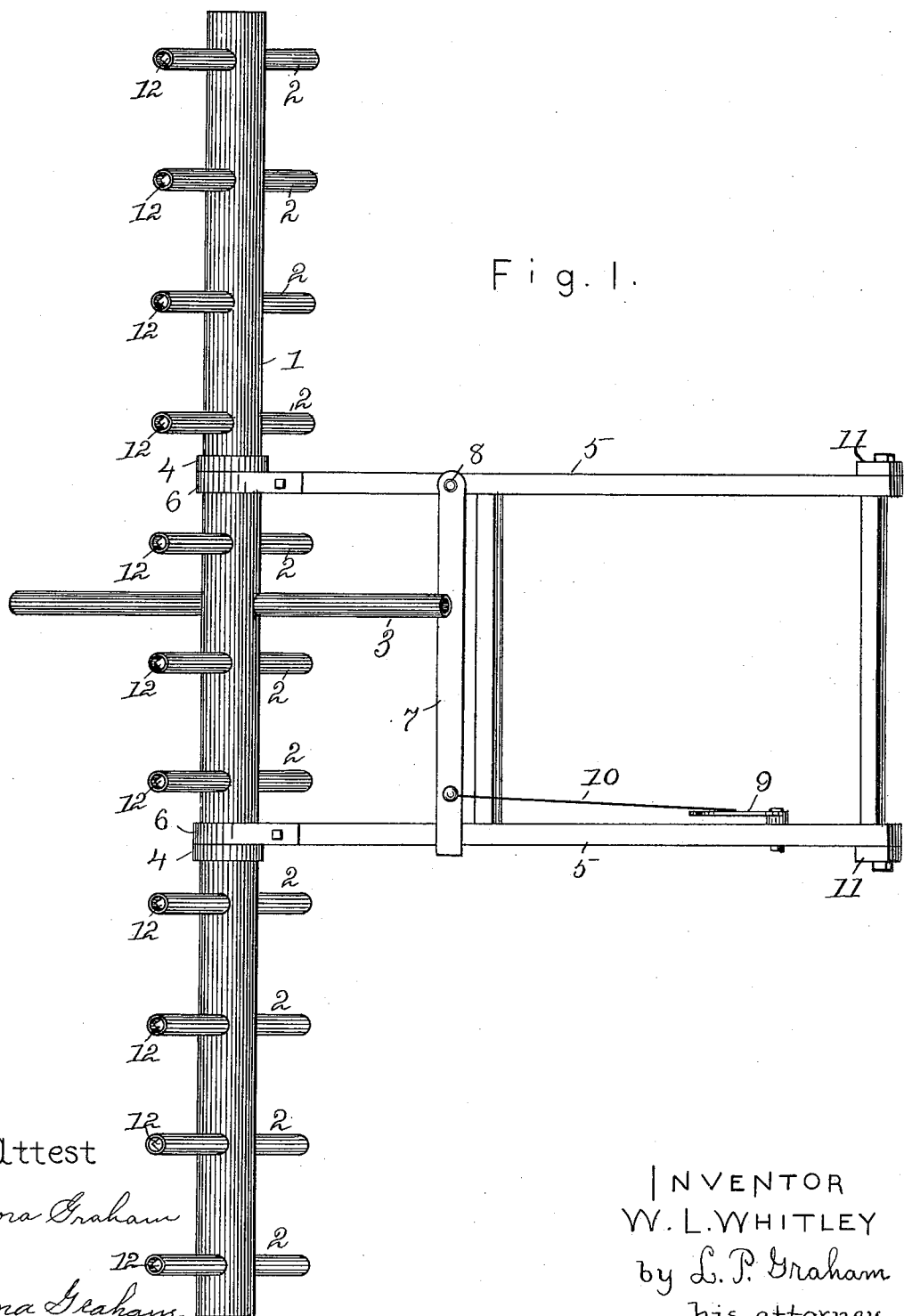

UNITED STATES PATENT OFFICE.

WASHINGTON L. WHITLEY, OF HARRISTOWN, ILLINOIS.

STALK-RAKE.

SPECIFICATION forming part of Letters Patent No. 617,843, dated January 17, 1899.

Application filed April 30, 1898. Serial No. 679,304. (No model.)

*To all whom it may concern:*

Be it known that I, WASHINGTON L. WHITLEY, of Harristown, in the county of Macon and State of Illinois, have invented certain new and useful Improvements in Stalk-Rakes, of which the following is a specification.

This invention is intended to supply a durable rake that will act generally in a superior manner and that will gather the stalks from depressions as well as from entirely level ground. It is exemplified in the structure herein described, and it is defined in the appended claims.

In the drawings forming part of this specification, Figure 1 is a plan of a rake embodying my improvement. Fig. 2 is a side elevation of the same. Fig. 3 is a section through one of the teeth, showing the supplementary plunger-tooth therein.

The rake consists of a tubular cross-beam 1, having a set of tubular teeth 2 fixed therein and extended equal distances in opposite directions therefrom. Divided bands 4 are clamped onto the cross-beam by means of bolts $4^a$, and the frame 5 is fastened to the cross-beam by straps 6, that encircle the beam adjacent to bands 4. The frame 5 may be made of any desired shape and size, but it is preferably provided with downwardly-extended projections 11, that are adapted to engage the rear bolster of a wagon and provide means for drawing the rake across the field. A hand-lever 9 is pivoted on the frame in position to be operated by a man on the wagon with which the rake is connected when in operation, and it connects through rod 10 with a horizontal trip-lever 7, extended across the frame and pivoted at 8 to one side thereof. A tooth 3, slightly longer than the rake-teeth, projects forward from cross-bar 1 and rests on trip-lever 7 when the teeth are in operative position. The teeth project downward and forward when in raking position and their ends are beveled slightly to conform to the general level of the ground with which they are in contact. In each of the principal teeth 2 is placed a supplementary plunger-tooth 12. The plunger-teeth have free motion lengthwise in the main teeth to a considerable extent and they would operate satisfactorily if the freedom of motion were entirely unrestricted. It is advisable, however, to restrict extreme longitudinal motion of the supplementary teeth, and this may be effected by slotting or grooving the teeth the required distance, as shown at $12^a$ in Fig. 3, and extending pins, as 13, through the grooves or slots. This permits operative movement of the plunger-teeth and prevents their separation from the main teeth. The plunger-teeth are preferably made slightly shorter than the main teeth and their mode of operation is in part suggested in Fig. 3.

As the rake is drawn across the field the principal teeth travel along level ground, gathering the stalks and carrying them along until the rake is full or until a predetermined location is reached, when the trip-lever is drawn from under the bar or tube 3 and the rake is permitted to make a semirotation, disengaging itself from the accumulated stalks and bringing the previously inactive ends of the teeth into operation. When any particular tooth reaches a depression below the general level of the ground, its plunger-tooth automatically follows the depression, gathering up any stalks that may chance to be therein, and as the depression is passed it will withdraw into the main tooth and become temporarily inoperative. When the rake makes a semirotation, as hereinbefore described, the plunger-teeth first protrude out of the ascending ends of the main teeth and maintain this position until the shift is nearly completed, when they descend rapidly by force of gravity, forcing any obstructions out of the descending ends that may have accumulated and taking up operative positions with relation to the ends of teeth newly brought into action. This operation is repeated indefinitely, the main teeth doing the principal work, the plunger-teeth clearing up the depressions, and the rake-teeth changing ends at each semirotation resulting from movement of the trip-lever.

A rake so constructed will last a long time, as its cross-bar and teeth are of metal. The rounded surface of the cross-bar obviates the tendency existing in rakes having square cross-bars to trip on a full load, there is no jump or tremble about the operation of the teeth, and the stalks are gathered with unusual completeness.

While the rake is particularly designed for stalks, it is not improbable that it may be found advantageous for other purposes.

What I claim is—

1. In a rake for stalks and the like, the combination of a cross-beam journaled in a frame, tubular teeth secured at their longitudinal centers to the cross-beam, and a supplementary tooth in each of the tubular teeth free to protrude from either end of the tubular tooth by action of gravity, substantially as set forth.

2. In a rake for stalks and the like, the combination of a cross-beam journaled in a frame, tubular teeth secured at their longitudinal centers to the cross-beam, a supplementary tooth in each of the tubular teeth free to protrude from either end of the tubular tooth by action of gravity and catches to hold the supplementary teeth in the tubular teeth, substantially as set forth.

In testimony whereof I sign my name in the presence of two subscribing witnesses.

WASHINGTON L. WHITLEY.

Witnesses:
 JAMES T. WHITLEY,
 L. P. GRAHAM.